United States Patent
Milstead

(10) Patent No.: US 9,436,773 B2
(45) Date of Patent: Sep. 6, 2016

(54) METHOD AND COMPUTER PROGRAM FOR DISCOVERING A DYNAMIC NETWORK ADDRESS

(75) Inventor: James Michael Milstead, Madison, AL (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 13/451,994

(22) Filed: Apr. 20, 2012

(65) Prior Publication Data

US 2013/0282922 A1 Oct. 24, 2013

(51) Int. Cl.
*G06F 15/16* (2006.01)
*G06F 17/30* (2006.01)
*H04L 29/12* (2006.01)
*H04L 29/08* (2006.01)
*H04L 9/32* (2006.01)

(52) U.S. Cl.
CPC ..... *G06F 17/30887* (2013.01); *G06F 17/3089* (2013.01); *G06F 17/30864* (2013.01); *G06F 17/30876* (2013.01); *H04L 29/12009* (2013.01); *H04L 29/12943* (2013.01); *H04L 61/35* (2013.01); *H04L 61/6072* (2013.01); *G06F 17/30038* (2013.01); *H04L 9/3297* (2013.01); *H04L 67/02* (2013.01)

(58) Field of Classification Search
CPC .................. G06F 17/30887; G06F 17/30864; G06F 17/30876; G06F 17/3089; G06F 17/30038; H04L 29/12943; H04L 67/02; H04L 9/3297; H04L 29/12009; H04L 61/35; H04L 61/6072
USPC ........................................................ 709/245
See application file for complete search history.

(56) References Cited

U.S. PATENT DOCUMENTS

| | | | |
|---|---|---|---|
| 6,957,224 B1 | 10/2005 | Megiddo et al. | |
| 7,536,713 B1* | 5/2009 | Bartholomew ... | G06F 17/30743 380/229 |
| 7,594,011 B2 | 9/2009 | Chandra | |
| 7,886,032 B1* | 2/2011 | Louz-On ........... | G06F 17/30864 709/217 |
| 8,346,755 B1* | 1/2013 | Kapoor et al. ................ | 707/710 |
| 8,578,261 B1* | 11/2013 | Gupta ............... | G06F 17/30899 715/205 |
| 2003/0018622 A1* | 1/2003 | Chau ................. | G06F 17/30873 |
| 2003/0037070 A1* | 2/2003 | Marston ....................... | 707/200 |
| 2003/0208472 A1* | 11/2003 | Pham ................. | 707/2 |
| 2003/0229857 A1* | 12/2003 | Sayuda ............. | G06F 17/30896 715/249 |
| 2008/0071790 A1* | 3/2008 | McKee et al. .................. | 707/10 |
| 2009/0119329 A1* | 5/2009 | Kwon et al. .................. | 707/102 |
| 2009/0307161 A1* | 12/2009 | Dalal et al. ..................... | 706/12 |
| 2011/0173178 A1* | 7/2011 | Conboy et al. .............. | 707/709 |
| 2011/0246558 A1* | 10/2011 | Shenfield ..................... | 709/203 |
| 2012/0010997 A1* | 1/2012 | Nair et al. .................. | 705/14.54 |

(Continued)

OTHER PUBLICATIONS

Warren, Christina; How to Embed Practically Anything on Your Blog or Website; Jun. 5, 2011; 3 pages.*

(Continued)

*Primary Examiner* — Oleg Survillo
(74) *Attorney, Agent, or Firm* — McDonnell Boehnen Hulbert & Berghoff LLP

(57) ABSTRACT

A method for internet communication is presented. An identifier is embedded in an internet-accessible computer readable medium, and an internet address is embedded in the internet-accessible computer readable medium in a relation to the identifier. The identifier is located to provide an identifier location, and the internet address is located based on the identifier location.

19 Claims, 12 Drawing Sheets

(56) References Cited

U.S. PATENT DOCUMENTS

| | | | |
|---|---|---|---|
| 2012/0198072 A1* | 8/2012 | Kirsch et al. | 709/226 |
| 2012/0215757 A1* | 8/2012 | Weisman et al. | 707/709 |
| 2012/0290923 A1* | 11/2012 | Bedingfield et al. | 715/234 |
| 2012/0297279 A1* | 11/2012 | Lin et al. | 715/205 |
| 2012/0303599 A1* | 11/2012 | Patil | 707/706 |
| 2013/0031636 A1* | 1/2013 | Altschul et al. | 726/26 |
| 2013/0117439 A1* | 5/2013 | Oliver et al. | 709/224 |
| 2013/0151857 A1* | 6/2013 | Agrawal | 713/178 |
| 2013/0185332 A1* | 7/2013 | Koide et al. | 707/783 |
| 2013/0198242 A1* | 8/2013 | Levy | 707/803 |

OTHER PUBLICATIONS 13162782.0 extended European search report, Nov. 11, 2013.

Anonymous: "URL shortening—Wikipedia, the free encyclopedia" Apr. 19, 2012, pp. 1-6, XP055086404, Retrieved from the Internet: URL:http://en.wi ki pedia.org/w/index.php?title=URL_shorteni ng&oldid=488108360 [retrieved on Nov. 1, 2013]p. 1-p. 2.

Anonymous: "Creating a TinyURL Clone", Apr. 4, 2012, pp. 1-6, XP055086405, Retrieved from the Internet: URL:http://web.arch i ve.org/web/20120404043521/http://www.ultramegatech.com/2009/03/creating-a-tinyurl-clone[retrieved on Nov. 1, 2013] p. 1-p. 3.

* cited by examiner

```
// Returns a unique search term lasting between the start and end dates
private string GetSearchTerm(DateTime dtStart, DateTime dtEnd)
{
    // Get a string containing the start date and end date
    string strPeriodString = dtStart.ToString("yyyyMMddHHmm") + "-" + dtEnd.ToString("yyyyMMddHHmm");

// Encrypt the period string
    string strEncryptedPeriodString = Encryption.CryptorEngine.Encrypt(strPeriodString, true);

// Base-64 encode the period string
    string strEncodedPeriodString = System.Convert.ToBase64String(
                        System.Text.Encoding.Default.GetBytes(strEncryptedPeriodString));

// Get every 5th character of the encoded, encrypted string to use as my search term
    string strSearchTerm = "";
    for (int i = 0; i <= strEncodedPeriodString.Length - 1; i++)
    {
        if (i % 5 == 0)
        {
            strSearchTerm = strSearchTerm + strEncodedPeriodString.Substring(i, 1);
        }
    }

// Return the search term
    return strSearchTerm;
}
```

FIG. 5

METHOD AND COMPUTER PROGRAM FOR DISCOVERING A DYNAMIC NETWORK ADDRESS

FIELD

Embodiments of the present disclosure relate generally to Internet communication. More particularly, embodiments of the present disclosure relate to managing connections for Internet communication.

BACKGROUND

Software application developers may desire a covert way to dynamically discover connection information (such as IP addresses) of servers that their client applications will connect to. Current technologies for client applications to discover a server include hard-coded IP addresses or server names resolved with a domain name service (DNS), or peer-to-peer broadcast methods. A problem with these approaches is that once discovered, system administrators can block the connections or protocols effectively isolating the client application and rendering the client application useless.

SUMMARY

A method for internet communication is disclosed. An identifier is embedded in an internet-accessible computer readable medium, and an internet address is embedded in the internet-accessible computer readable medium in a relation to the identifier. The identifier is located to provide an identifier location, and the internet address is located based on the identifier location.

In this manner, client software can dynamically re-configure a communication to evade blocks to communication with a server, thereby providing an internet communication with minimal chance of detection. Thus, even if an internet address is detected, the client software can automatically re-configure to find a new server.

In an embodiment, a method for internet communication embeds an identifier in an internet-accessible computer readable medium. The method further embeds an internet address in the internet-accessible computer readable medium in a relation to the identifier. The method further locates the identifier to provide an identifier location, and locates the internet address based on the identifier location.

In another embodiment, a method for a client software module to communicate with a partner software module locates an embedded identifier in an internet-accessible computer readable medium to provide an identifier location. The method further locates an embedded internet address in the internet-accessible computer readable medium in a relation to the identifier based on the identifier location. The method further communicates with a partner software module based on the embedded internet address.

In a further embodiment, a method for communication with a client software module embeds an identifier in an internet-accessible computer readable medium. The method further embeds an internet address in the internet-accessible computer readable medium in a relation to the identifier, and communicates with a client software module. The client software module locates the identifier to provide an identifier location, and locates the internet address based on the identifier location.

In a further embodiment, one or more computer-readable storage media having computer-executable instructions embodied thereon, wherein when executed by at least one processor, the computer-executable instructions cause the at least one processor to embed an identifier in an internet-accessible computer readable medium. The computer-executable instructions further embeds an internet address in the internet-accessible computer readable medium in a relation to the identifier, and communicates with a client software module. The client software module locates the identifier to provide an identifier location, and locates the internet address based on the identifier location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 5 is an illustration of an exemplary search term generation algorithm according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, data communication, encryption, the Internet, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of some non-limiting applications, namely, client. Embodiments of the disclosure, however, are not limited to such applications, and the techniques described herein may also be utilized in other applications. For example but without limitation, embodiments may be applicable to cloud services, cyber-security services, or other internet communication.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
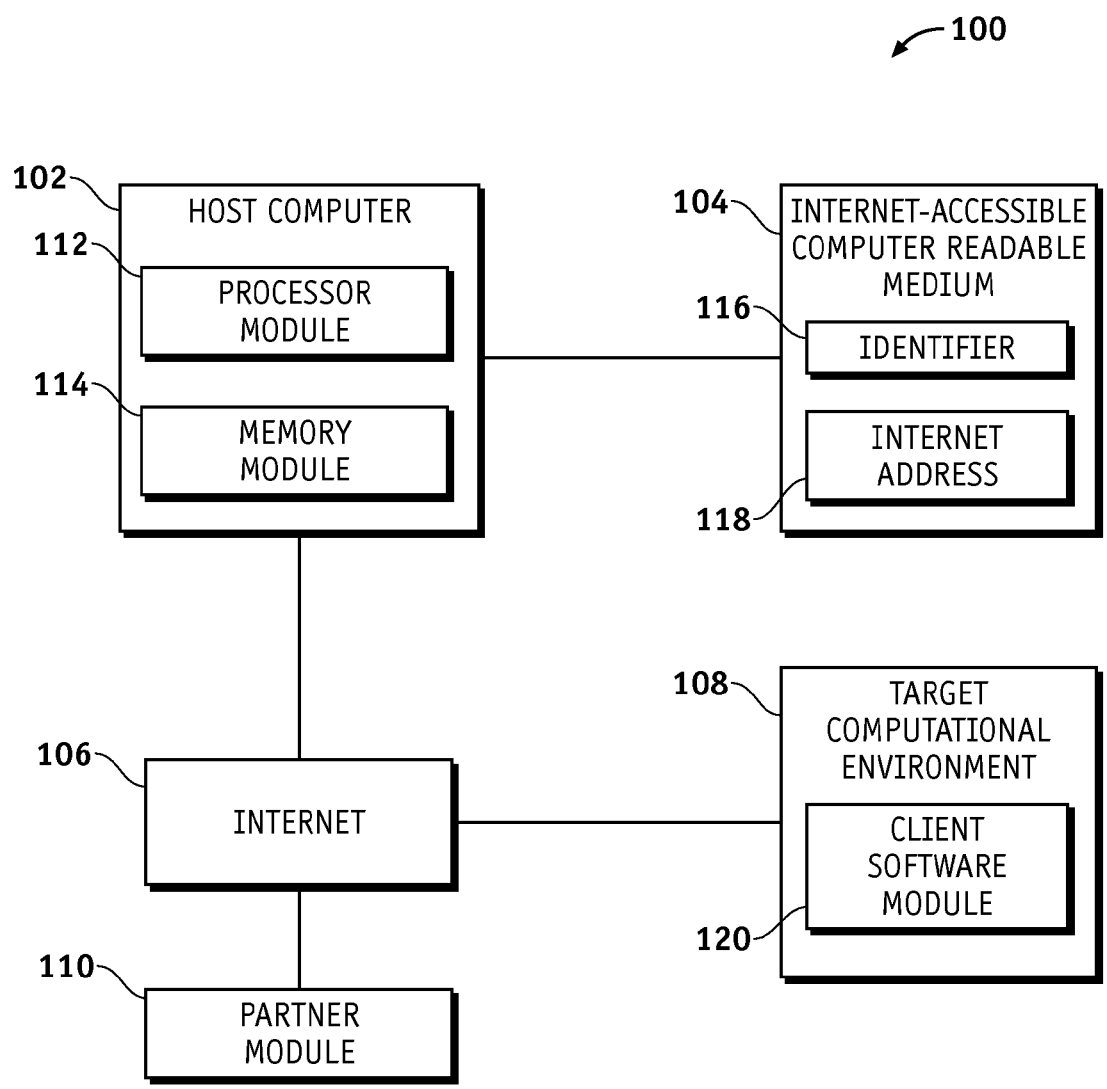
FIG. 1 is an illustration of an exemplary block diagram of a communication system according to an embodiment of the disclosure.

FIG. 1 is an illustration of an exemplary block diagram of a communication system (system 100) according to an embodiment of the disclosure. System 100 may comprise an internet-accessible computer readable medium 104 on a host computer 102, a target computational environment 108, a client software module 120, a partner module 110, and the internet 106.

The client software module 120 may comprise, for example but without limitation, a clandestine action software program, or other process operable to be deployed in the target computational environment 108. The client software module 120 may take action comprising, for example but without limitation, accessing information, communicating information outside the target computational environment 108, or other action. The client software module 120 may communicate with and/or be controlled by the partner module 110, which resides outside the target computational environment 108.

The client software module 120 is configured to locate an identifier 116 in the internet-accessible computer readable medium 104 to provide an identifier location. The client software module 120 is further operational to locate an internet address 118 in the internet-accessible computer readable medium 104 in a relation to the identifier 116 based on the identifier location. The client software module 120 is further configured to communicate with the partner module 110 based on the internet address 118. The internet address 118 may comprise, for example but without limitation, an internet protocol address (IP address), a network address, a universal resource locator (URL), or other internet address. The internet address 118 may be encrypted to comprise an encrypted internet address.

The client software module 120 and the partner module 110 use a common algorithm for generating identifiers such as the identifier 116. For example, the partner module 110 may generate the identifier 116 and embed it in a web page. The client software module 120 may generate a duplicate of the identifier 116 and search for the identifier 116 using a search engine. The identifier 116 (search term), executes the search, finds the partner module 110 (server), and initiates a connection to the server.

In operation, system 100 autonomously re-configures itself if blocked. If the administrators block the connection to the partner module 110 (server), the client software module 120 automatically finds a new server by generating a new identifier 116 (search term) and finds the associated internet address 118 (location). Thus, even if the internet address 118 is detected, the client software module 120 can automatically re-configure to find a new server. This is in contrast to exiting technologies typically used, which include hard-coded IP addresses or server names resolved with a domain name service (DNS).

For example, if a communication is blocked, the client software module 120 is configured to automatically generate a new search term such as the identifier 116 based on, for example, a current date/time, a pseudo random number, or other sequence. Substantially simultaneously, the client software module 120 submits the new search term to a search engine so the client software module 120 can find new connection information such as the internet address 118. In this manner, the client software module 120 re-configures itself if blocked.

The partner module 110 may comprise, for example but without limitation, a control program, or other process operable to communicate with the client software module 120. The partner module 110 resides outside the target computational environment 108. The partner module 110 may be operational to embed the identifier 116 in the internet-accessible computer readable medium 104. The partner module 110 may also be operable to embed the internet address 118 in the internet-accessible computer readable medium 104 in a relation to the identifier 116. The partner module 110 communicates with the client software module 120.

The internet-accessible computer readable medium 104 may comprise, for example but without limitation, a web page, an internet accessible message posting database (e.g., twitter), or other internet-accessible computer readable medium.

The host computer 102 is configured to host the internet-accessible computer readable medium 104. The host computer 102 may comprise, for example but without limitation, a processor module 112, a memory module 114, or other module.

The processor module 112 comprises processing logic that is configured to carry out the functions, techniques, and processing tasks associated with the operation of the system 100. In particular, the processing logic is configured to support the system 100 described herein. For example, the processor module 112 may direct the signal communication in the system 100.

The processor module 112 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 114 may comprise a data storage area with memory formatted to support the operation of the system 100. The memory module 114 is configured to store, maintain, and provide data as needed to support the functionality of the system 100. For example but without limitation, the memory module 114 may store the internet address 118, the identifier 116, or other data.

In some embodiments, the memory module 114 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 114 may be coupled to the processor module 112 and configured to store, for example but without limitation, a database, and the like. Additionally, the memory module 114 may represent a dynamically updating database containing a table for updating the database, and the like. The memory module 114 may also store, a computer program that is executed by the processor module 112, an operating system, an application program, tentative data used in executing a program, or other application.

The memory module 114 may be coupled to the processor module 112 such that the processor module 112 can read information from and write information to the memory module 114. For example, the processor module 112 may access the memory module 114 to access the internet address 118, the identifier 116, or other data.

As an example, the processor module 112 and memory module 114 may reside in respective application specific integrated circuits (ASICs). The memory module 114 may also be integrated into the processor module 112. In an embodiment, the memory module 114 may comprise a cache memory for storing temporary variables or other intermediate information during execution of instructions to be executed by the processor module 112.

Figure 2:
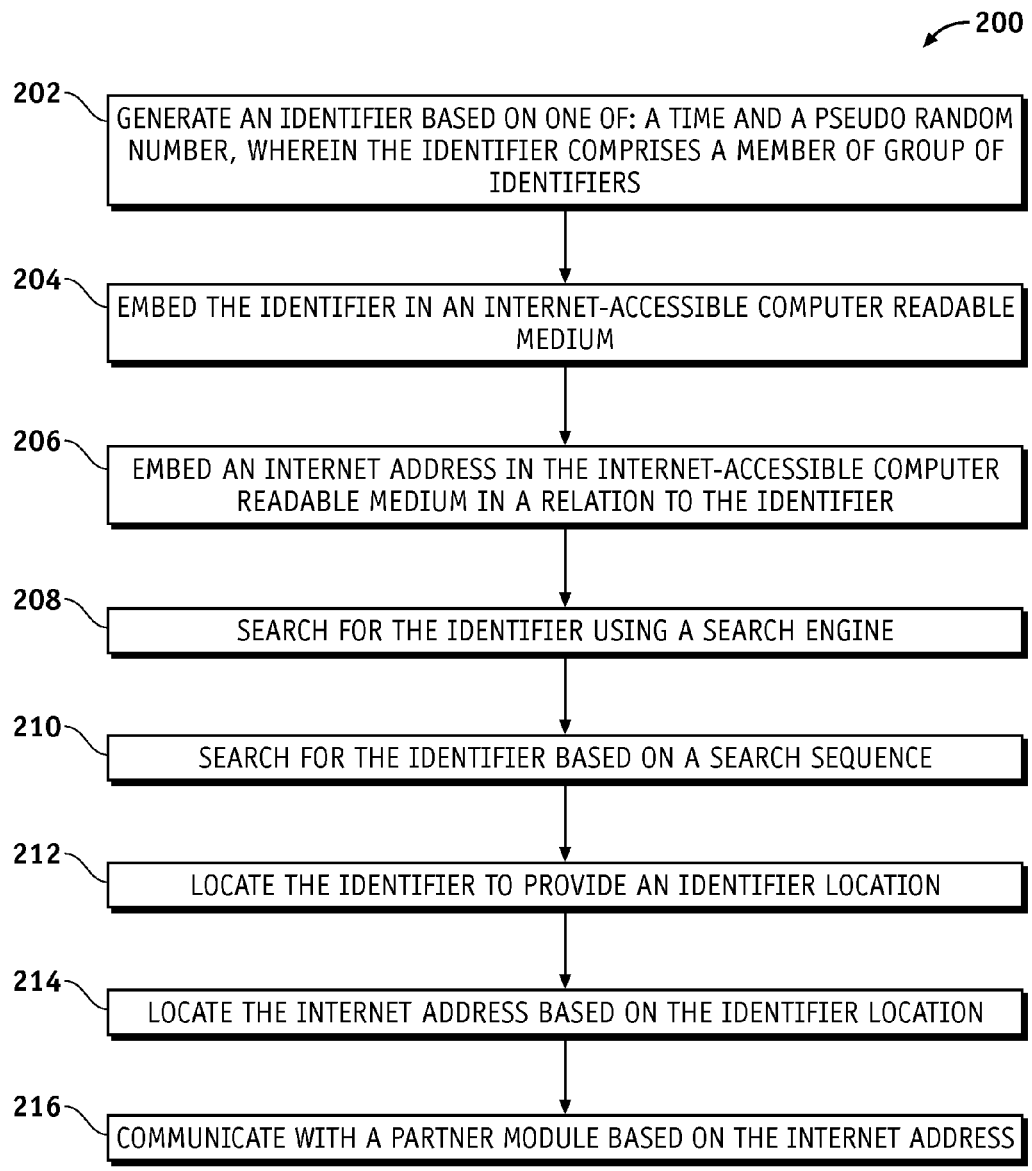
FIG. 2 is an illustration of an exemplary flowchart showing a process for communication according to an embodiment of the disclosure.

FIG. 2 is an illustration of an exemplary flowchart showing a process (process 200) for communication according to an embodiment of the disclosure. The various tasks performed in connection with process 200 may be performed mechanically, by software, hardware, firmware, computer-readable software, computer readable storage medium, or any combination thereof. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

For illustrative purposes, the following description of process 200 may refer to elements mentioned above in connection with FIG. 1. In some embodiments, portions of the process 200 may be performed by different elements of the system 100 such as: the internet-accessible computer readable medium 104 on the host computer 102, the target computational environment 108, the client software module 120, the partner module 110, the internet 106, etc. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

Process 200 may begin by a partner module (e.g., a server) such as the partner module 110 generating an identifier such as the identifier 116 based on one of: a time and a pseudo random number, wherein the identifier comprises a member of group of identifiers (task 202).

Process 200 may continue by the partner module 110 embedding the identifier 116 in an internet-accessible computer readable medium such as the internet-accessible computer readable medium 104 (task 204). The identifier 116 may be generated based on, for example but without limitation, a time and a pseudo random number, or other identifier, wherein the identifier comprises a member of group of identifiers.

Process 200 may continue by the partner module 110 embedding an internet address such as the internet address 118 in the internet-accessible computer readable medium 104 in a relation to the identifier 116 (task 206).

Process 200 may continue by a client software module such as the client software module 120 searching for the identifier 116 using a search engine (task 208). The search engine may comprise, for example but without limitation, a website which allows posting of user-generated content, a website with an internal search functionality, or other computational information search.

Process 200 may continue by the client software module 120 searching for the identifier 116 based on a search sequence (task 210). The identifier 116 may comprise, for example but without limitation, a member of a group of identifiers, or other identifier. The search sequence may comprise, for example but without limitation, a time, a pseudo random number, or other sequence.

Process 200 may continue by the client software module 120 locating the identifier 116 to provide an identifier location (task 212).

Process 200 may continue by the client software module 120 locating the internet address 118 based on the identifier location (task 214).

Process 200 may continue by the client software module 120 communicating with the partner module 110 based on the internet address (task 216).

Figure 3:
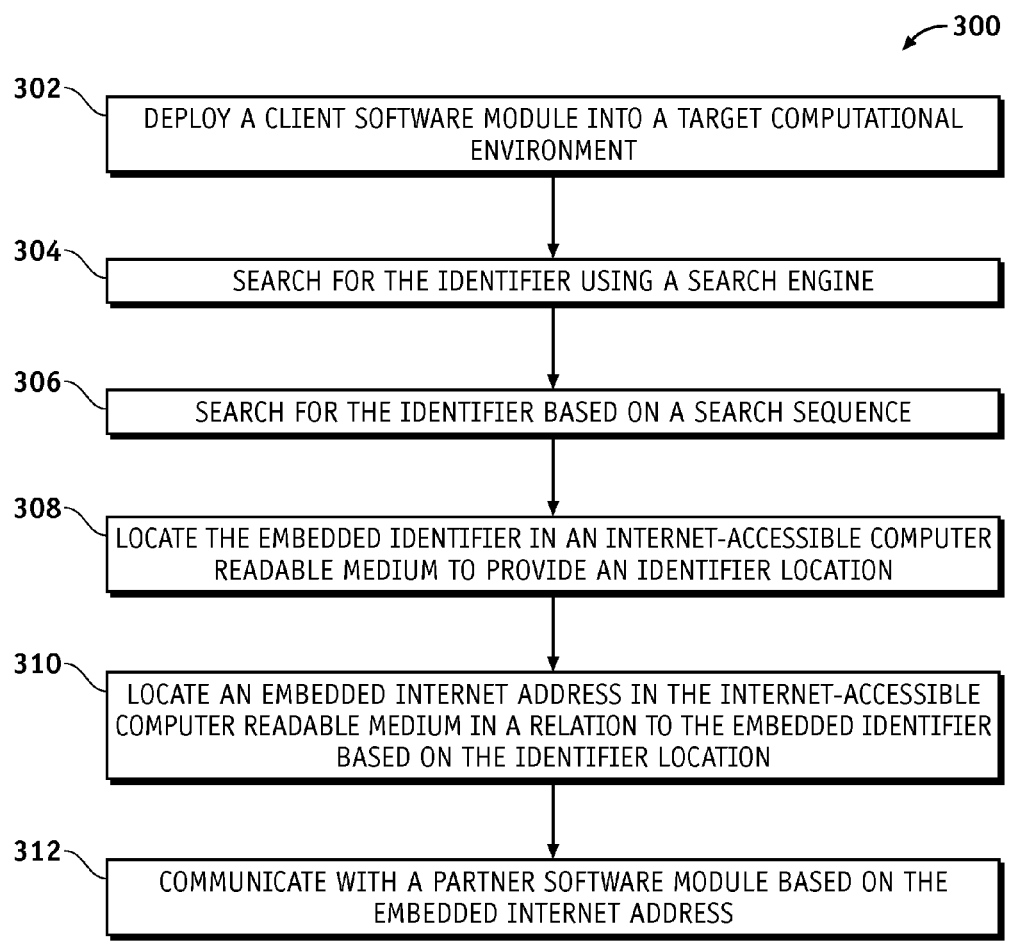
FIG. 3 is an illustration of an exemplary flowchart showing a process for a client software module to communicate with a partner software module according to an embodiment of the disclosure.

FIG. 3 is an illustration of an exemplary flowchart showing a process (process 300) for a client software module to communicate with a partner software module according to an embodiment of the disclosure. The various tasks performed in connection with process 300 may be performed mechanically, by software, hardware, firmware, computer-readable software, computer readable storage medium, or any combination thereof. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

For illustrative purposes, the following description of process 300 may refer to elements mentioned above in connection with FIG. 1. In some embodiments, portions of the process 300 may be performed by different elements of the system 100 such as: the internet-accessible computer readable medium 104 on the host computer 102, the target computational environment 108, the client software module 120, the partner module 110, the internet 106, etc. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

Process 300 may begin by deploying a client software module such as the client software module 120 into a target computational environment (task 302). The client software module 120 may be a clandestine software module such that it operates with a minimal chance of detection.

Process 300 may continue by the client software module 120 searching for an embedded identifier such as the identifier 116 using a search engine (task 304).

Process 300 may continue by the client software module 120 searching for the embedded identifier based on a search sequence (task 306). The embedded identifier may comprise, for example but without limitation, a member of a group of identifiers, or other identifier. The search sequence may comprise, for example but without limitation, a time, a pseudo random number, or other sequence.

Process 300 may continue by the client software module 120 locating the embedded identifier such as the identifier 116 in an internet-accessible computer readable medium such as the internet-accessible computer readable medium 104 to provide an identifier location (task 308).

Process 300 may continue by the client software module 120 locating an embedded internet address such as the internet address 118 in the internet-accessible computer readable medium 104 in a relation to the embedded identifier based on the identifier location (task 310).

Process 300 may continue by the client software module 120 communicating with a partner software module such as the partner module 110 based on the embedded internet address (task 312).

Figure 4:
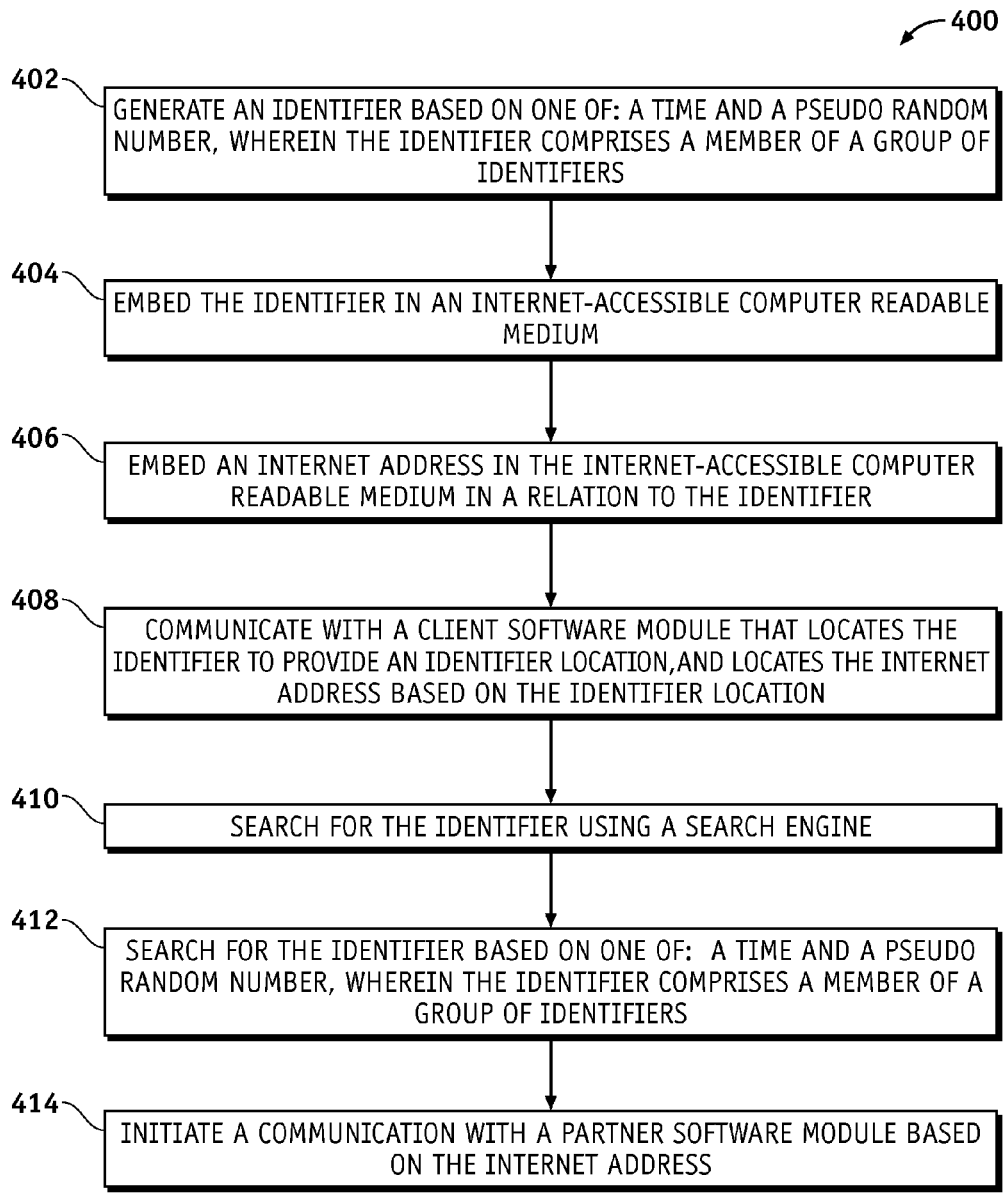
FIG. 4 is an illustration of an exemplary flowchart showing a process for communication with a client software module according to an embodiment of the disclosure.

FIG. 4 is an illustration of an exemplary flowchart showing a process (process 400) for communication with a client software module according to an embodiment of the disclosure. The various tasks performed in connection with process 400 may be performed mechanically, by software, hardware, firmware, computer-readable software, computer readable storage medium, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIG. 1. In some embodiments, portions of the process 400 may be performed by different elements of the system 100 such as: the internet-accessible computer readable medium 104 on the host computer 102, the target computational environment 108, the client software module 120, the partner module 110, the internet 106, etc. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

Process 400 may begin by a partner module (e.g., a server) such as the partner module 110 generating an identifier based on one of: a time and a pseudo random number, wherein the identifier comprises a member of group of identifiers (task 402).

Process 400 may continue by the partner module 110 embedding an identifier such as the identifier 116 in an internet-accessible computer readable medium such as the internet-accessible computer readable medium 104 (task 404).

Process 400 may continue by the partner module 110 embedding an internet address such as the internet address 118 in the internet-accessible computer readable medium 104 in a relation to the identifier 116 (task 406).

Process 400 may continue by the partner module 110 communicating with a client software module such as the client software module 120 that locates the identifier 116 to provide an identifier location, and locates the internet address 118 based on the identifier location (task 408).

Process 400 may continue by the client software module 120 searching for the identifier 116 using a search engine (task 410).

Process 400 may continue by the client software module 120 searching for the identifier 116 based a time or a pseudo random number, where the identifier 116 comprises a member of a group of identifiers (task 412).

Process 400 may continue by the client software module 120 initiating a communication with the partner module 110 based on the internet address 118 (task 414).

FIG. 5 is an illustration of an exemplary search term generation algorithm 500 according to an embodiment of the disclosure that can be performed by the client software module 120. The algorithm 500 generates a (substantially unique) search term 502 (identifier 116 in FIG. 1) that will be valid for a "window" defining how long the search term 502 is good for (e.g., 7 days, in this example). The window can be shorter to allow better agility. However, the algorithm 500 may be somewhat limited by how often the search engine indexes a "pointer web site" (e.g., can take up to four days on some search engine). FIG. 5 shows a commented source code for the algorithm 500 that computes a random, encrypted search term 502 based on a start date 504 and an end date 506 window. For example, using Sunday, 09/25/2011 as the start date 504 and Saturday, 10/01/2001 as the end date 506 the algorithm 500 yields the search term 508 such as a search term "RFhTLDdlejxP" (see 802 in FIG. 8). The algorithm 500 computes a random string of characters. More sophisticated approaches can generate natural language search terms which can look less "suspect" to countermeasures.

Figure 6:
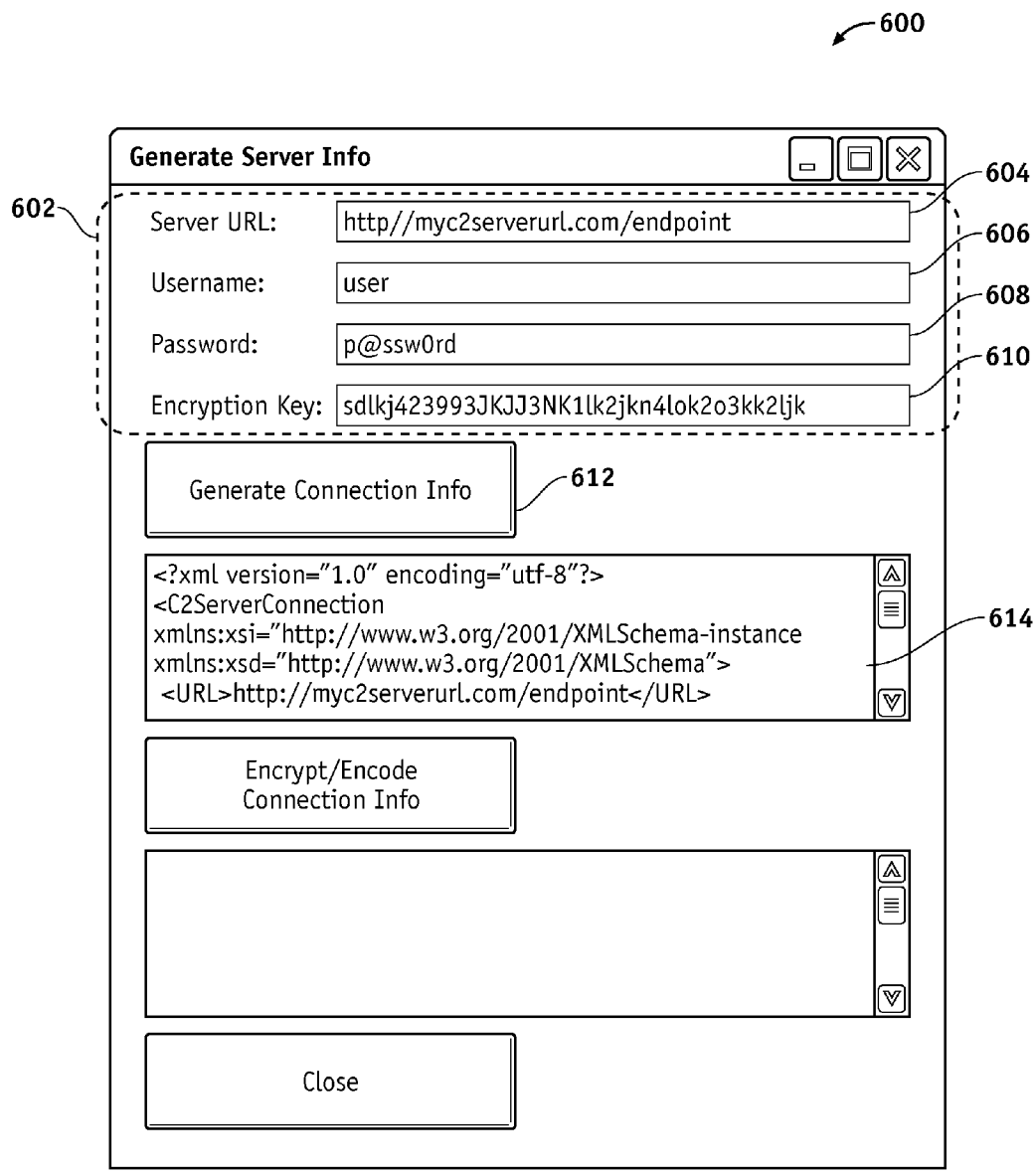
FIG. 6 is an illustration of an exemplary connection generation according to an embodiment of the disclosure.

FIG. 6 is an illustration of an exemplary command and control (C2) connection generation window 600 (window 600) according to an embodiment of the disclosure. The window 600 comprises server connection information 602 that can be encoded using any approach. The server connection information 602, may comprise, attributes such as, but without limitation, a URL 604, username 606, a password 608, encryption information 610, and/or other attribute. Window 600 takes the server connection information 602 as an input and by activating a generate connection info field 612 a user can generate an Extensible Markup Language (XML) based (XML-based) representation 614 from the server connection information 602 data.

Figure 7:
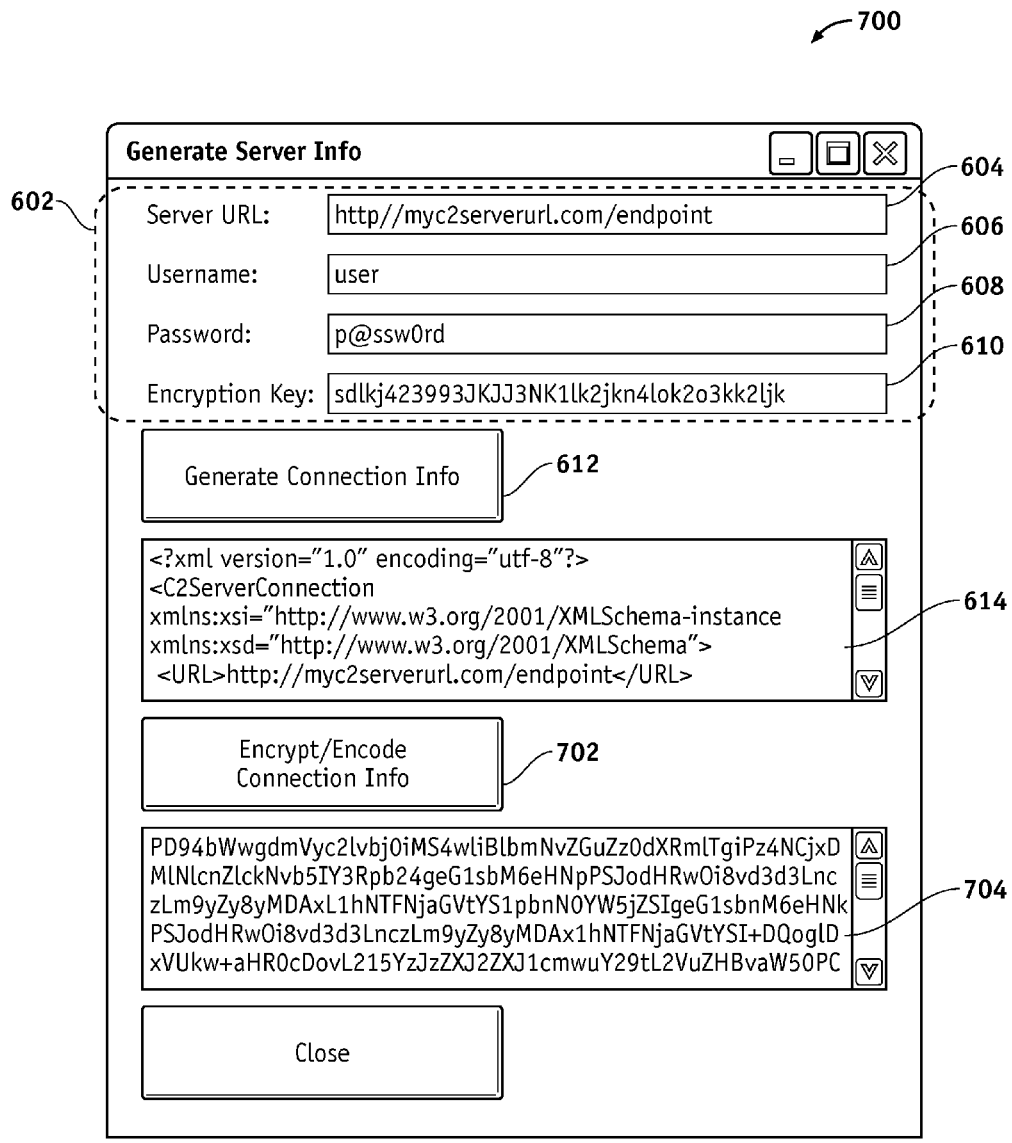
FIG. 7 is an illustration of an exemplary connection encryption according to an embodiment of the disclosure.

FIG. 7 is an illustration of an exemplary connection encryption window 700 according to an embodiment of the disclosure. The server connection information 602 is encrypted and Base-64 encoded to make sure a binary data can be represented as text. FIG. 7 shows the encrypted/ encoded connection information 704 that can be generated by activation of an encrypted/encoded connection information field 702.

Figure 8:
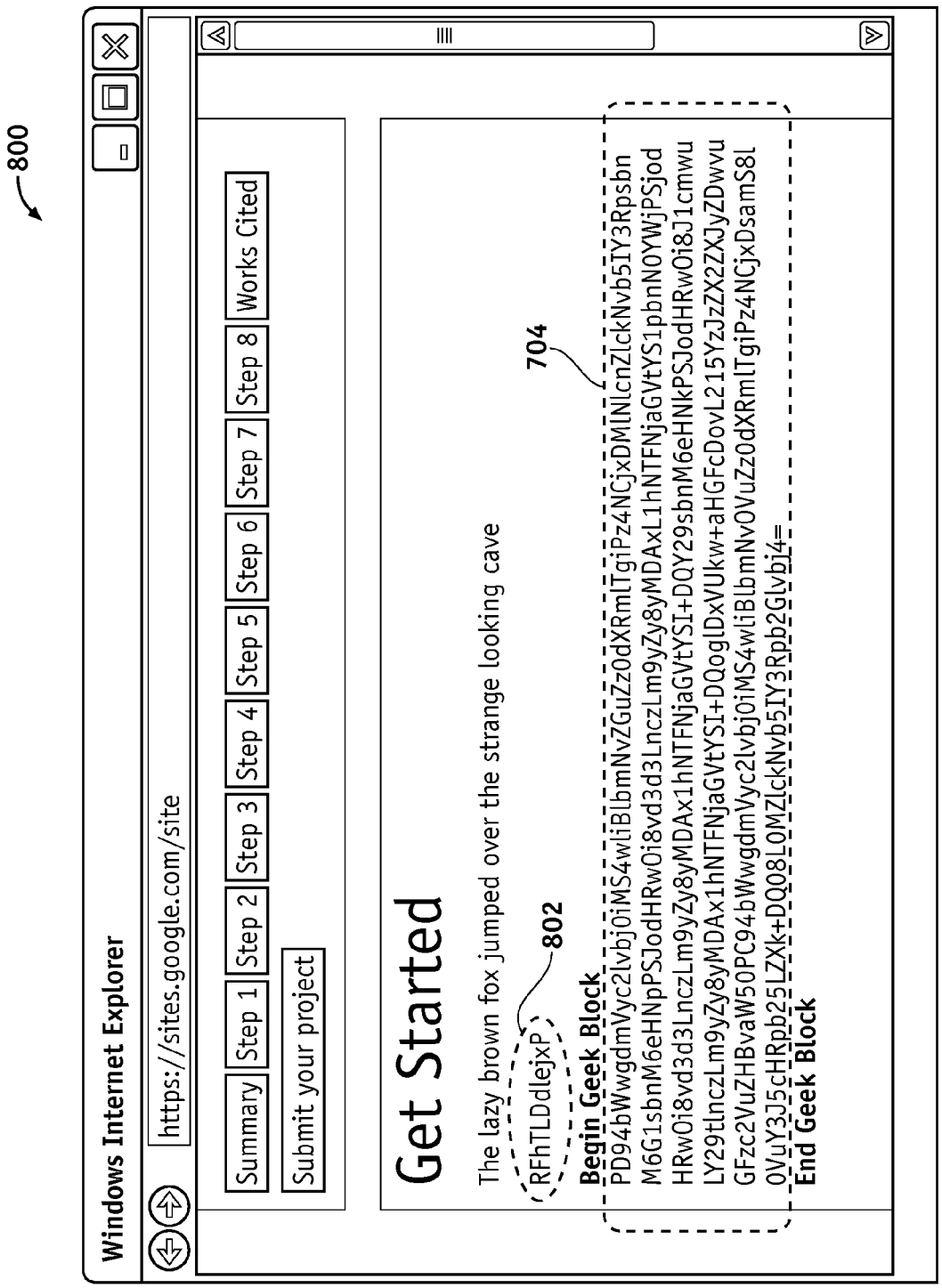
FIG. 8 is an illustration of an exemplary pointer website according to an embodiment of the disclosure.

FIG. 8 is an illustration of an exemplary pointer website 800 or pointer webpage 800 according to an embodiment of the disclosure. Pointer website 800 and pointer webpage 800 may be used interchangeably in this document. The pointer website 800 places the search term 802 (identifier 116 in FIG. 1, and 502 in FIG. 5) and the encrypted/encoded connection information 704 on a publicly accessible website. The text that is applicable is the search term 802 and the encrypted/encoded connection information 704.

Figure 9:
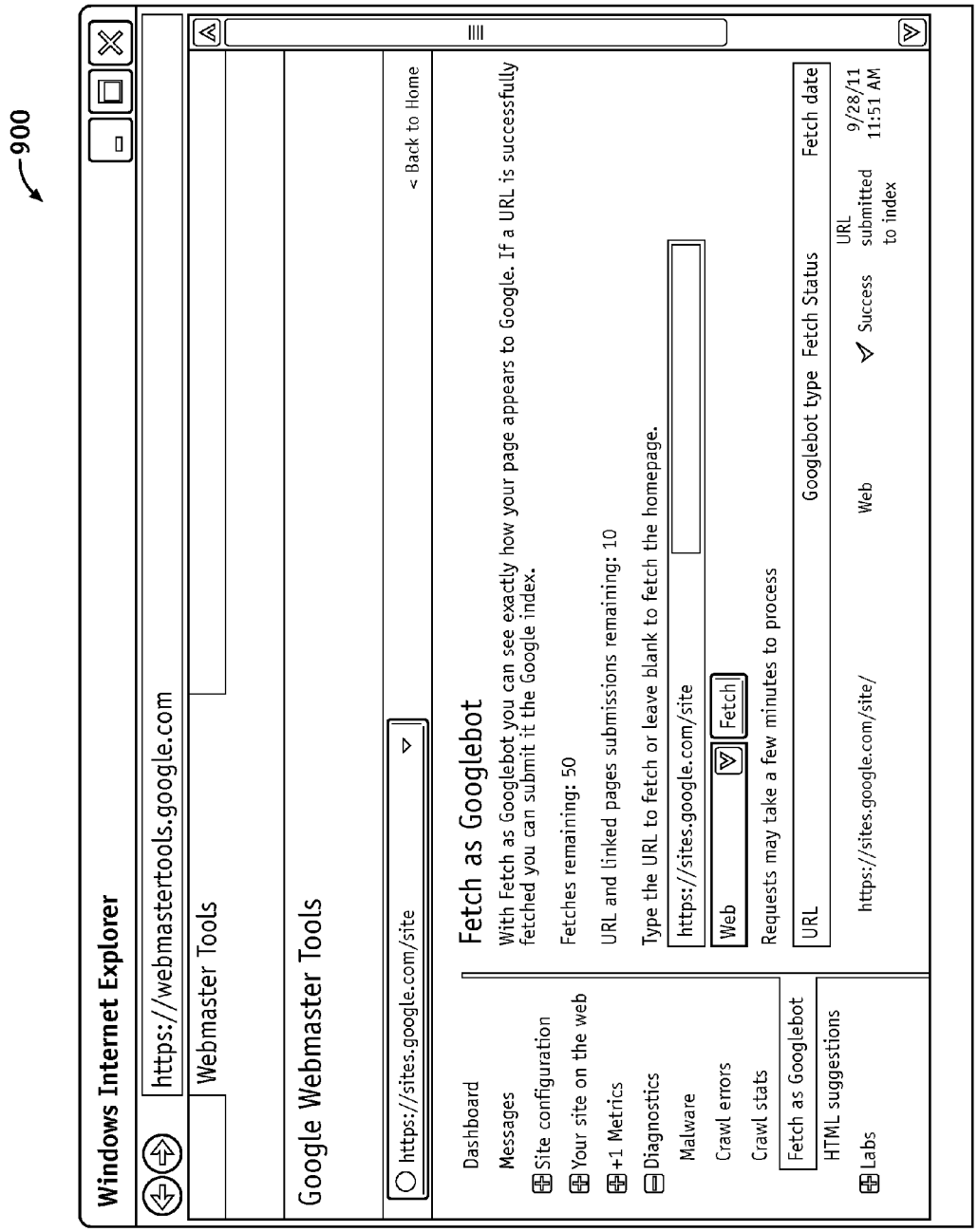
FIG. 9 is an illustration of an exemplary pointer website submission to a search engine according to an embodiment of the disclosure.

FIG. 9 is an illustration of an exemplary pointer website submission window 900 to a search engine according to an embodiment of the disclosure. Once the pointer webpage 800 (pointer website 800) comprising the search term 802 and the encrypted/encoded connection information 704 is posted to the web, the pointer webpage 800 is submitted to the search engine for indexing. Once the pointer webpage 800 is indexed, client applications such as the client software module 120 will be able to find the encrypted/encoded connection information 704 using the search term 802.

Figure 10:
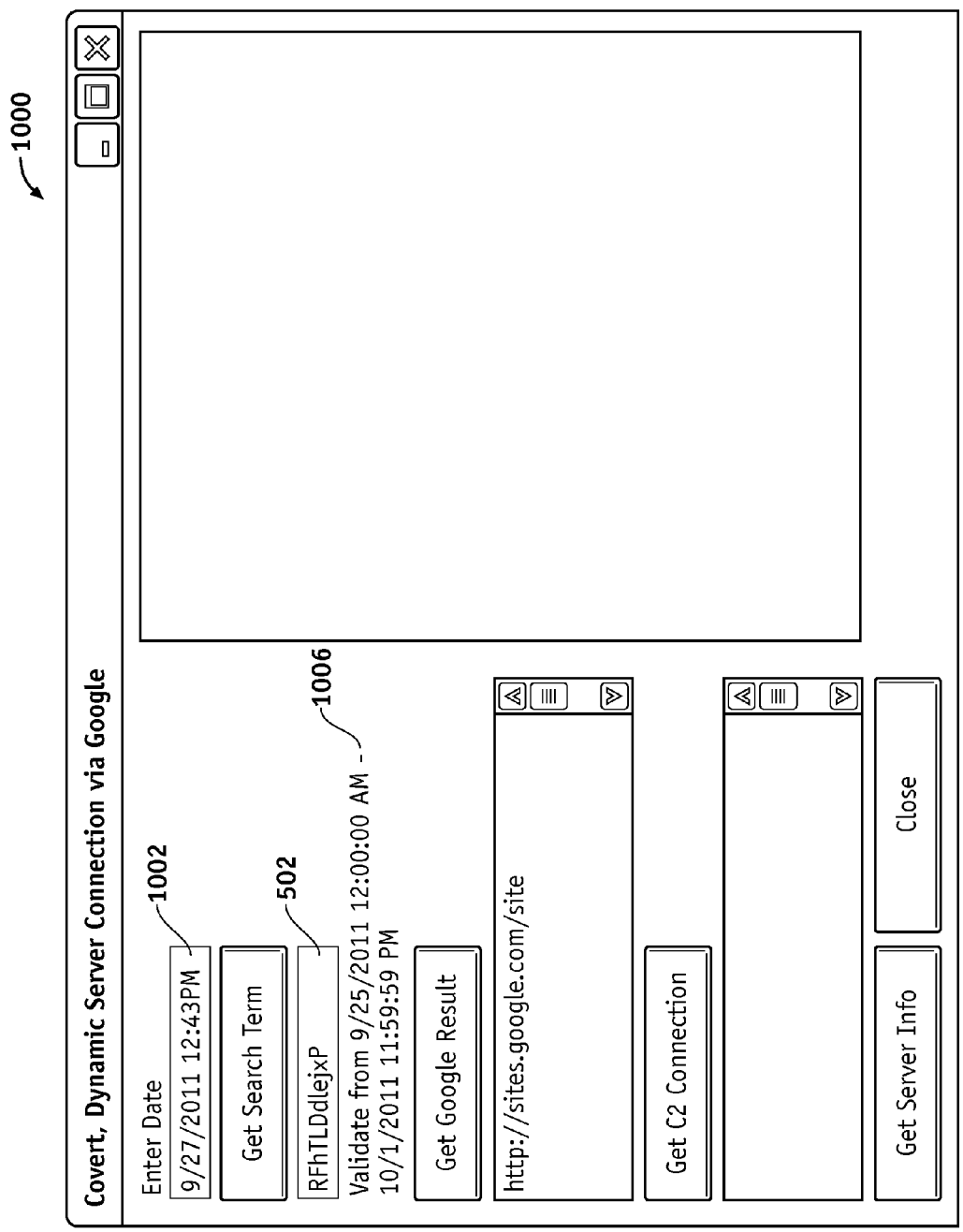
FIG. 10 is an illustration of an exemplary search term generation according to an embodiment of the disclosure.

FIG. 10 is an illustration of an exemplary search term generation window 1000 according to an embodiment of the disclosure. The current date/time 1002 is automatically determined based on, for example, a system time on a client computer such as the host computer 102. The algorithm 500 from FIG. 5 is executed to generate a unique search term 502 based on the current date/time 1002 and the "window" defining how long the search term 802 is good for (e.g., 7 days, in this example). In FIG. 10, the current date/time 1002 is 09/27/2011 12:43 PM. The search term 502/802 generated by the algorithm is "RFhTLDdlejxP" and it is valid 1006 from Sunday, 09/25/2011 through Saturday 10/01/2011.

Figure 11:
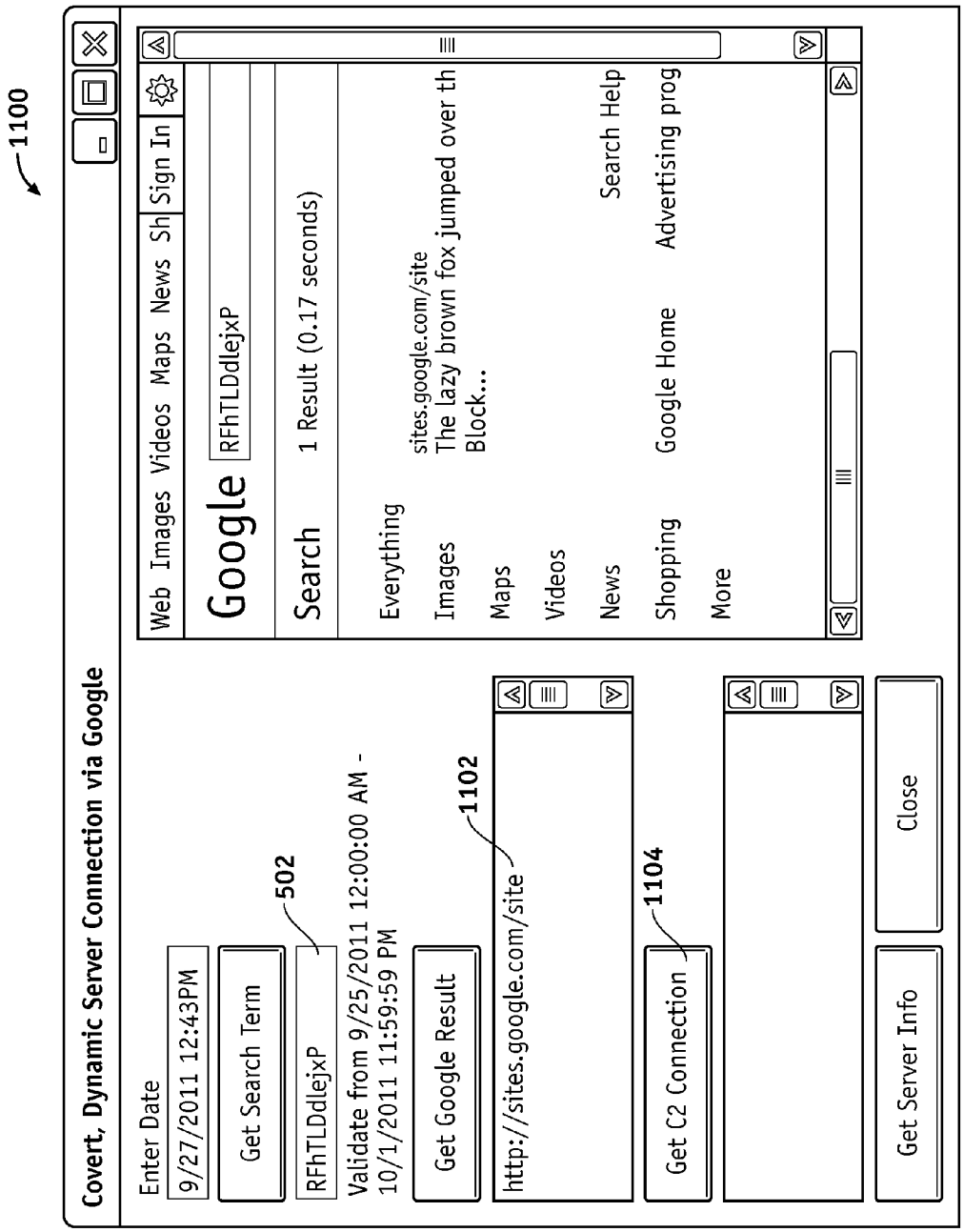
FIG. 11 is an illustration of an exemplary search for the search term and parsing results according to an embodiment of the disclosure.

FIG. 11 is an illustration of an exemplary search window 1100 for the search term 502 and parsing results according to an embodiment of the disclosure. The client software module 120 (client application) submits the search term 502 "RFhTLDdlejxP", which should be unique enough that no other web page but the "pointer web page" 800 would contain the text to the search engine. One result is returned. The client software module 120 parses the result out of the resulting search engine web page. FIG. 11 shows the URL 1102 parsed out of the search results.

Figure 12:
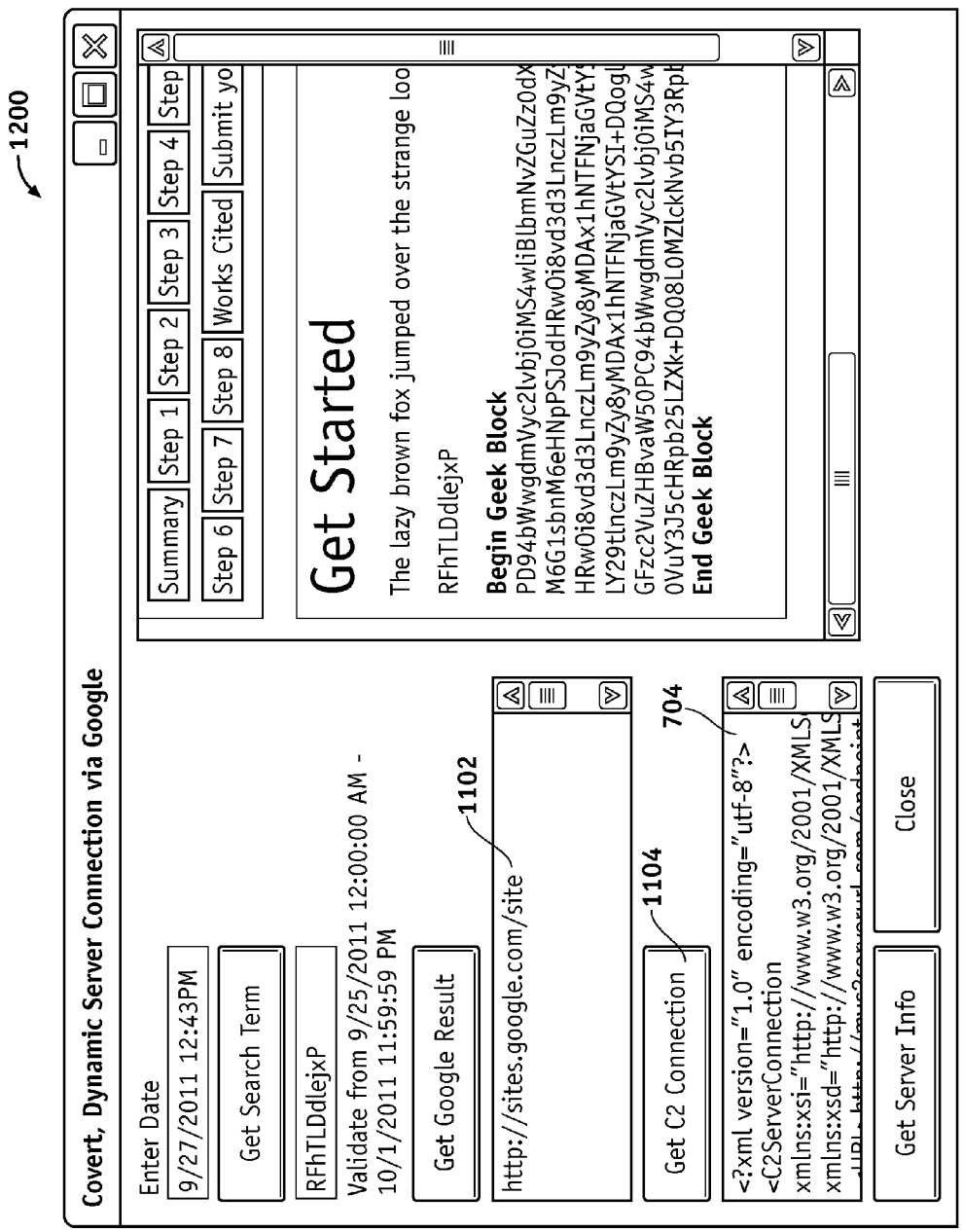
FIG. 12 is an illustration of an exemplary search result download and parsing of a connection according to an embodiment of the disclosure.

FIG. 12 is an illustration of an exemplary search result download window 1200 and parsing of the connection 1202 according to an embodiment of the disclosure. The client downloads the content at the URL 604/1102 for the search result and parses out the encrypted/encoded connection information 704. The client can now connect to the server at the specified URL 1102, using the specified username 606, the password 608, and the encryption information 610 shown in FIG. 6. As much information can be packed on the "pointer web site" 800 as needed to facilitate the connection.

In this manner, internet communication with minimal chance of detection may be accomplished by the system 100. System 100 reconfigures itself if a communication is blocked. If the communication is blocked, the client software module can automatically generate a search new term based on the current date/time. The client software module 120 submits the new search term to a search engine so the client software module 120 can find new connection information such as the internet address 118. This is in contrast to the existing systems which use hardcoded IP addresses. In the hardcoded approach, once the hardcoded IP address is discovered system administrators can block connections to the server effectively isolating the client software and rendering it useless.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 112 to cause the processor module 112 to perform specified operations. Such instructions, generally referred to as "computer program code" or "program code" (which may be grouped in the form of computer programs or other groupings), when executed, enable the system 100.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable"

means the system and/or the circuit is fully functional and calibrated, comprises logic for, and meets applicable operability requirements to perform a recited function when activated.

The invention claimed is:

1. A method for communication with a client software module, the method comprising:
   embedding, by action of a computer processor of a partner module, an identifier in an internet-accessible computer readable document;
   embedding, by action of the computer processor, an internet address comprising text in the internet-accessible computer readable document in relation to the identifier at a separate location from the identifier;
   communicating, by action of the computer processor, with the client software module that:
      generates a duplicate of the identifier utilizing a time-sensitive pseudo-random number sequence known in common by the client software module and the partner module;
      performs an internet search query for the identifier using an internet search engine utilizing the duplicate of the identifier as a search term;
      locates the identifier to obtain the internet-accessible computer readable document embedding the identifier; and
      locates the internet address from the obtained internet-accessible computer readable document; and
   configuring, in response to a request from the client software module, internet communication between the client software module and the partner module based on the internet address utilized in the request.

2. The method of claim 1, further comprising generating the identifier using an algorithm based on the time-sensitive pseudo random number sequence, wherein the identifier comprises a member of a group of identifiers.

3. The method of claim 1, wherein the client software module further searches for the identifier based on the time-sensitive pseudo random number sequence.

4. The method of claim 1, wherein the internet-accessible computer readable document comprises a webpage, and the internet address comprises an encrypted internet address comprising a URL encrypted and encoded into a formatted text on the webpage that is indexed by search engines as normal text and not as encrypted data.

5. The method of claim 1, further comprising generating the identifier using an algorithm based on the time-sensitive pseudo random number sequence, wherein the identifier comprises a member of a group of identifiers.

6. A method for a client software module to communicate with a partner software module, the method comprising:
   generating, by action of a computer processor, a duplicate of an identifier utilizing a time-sensitive pseudo-random number sequence known in common by the client software module and the partner software module;
   performing, by action of the computer processor, an internet search query for an embedded identifier using an internet search engine utilizing the duplicate of the identifier as a search term;
   locating, by action of the computer processor, the embedded identifier in an internet-accessible computer readable document to obtain an embedded internet address;
   locating, by action of the computer processor, the embedded internet address in the internet-accessible computer readable document in relation to the embedded identifier based on location of the identifier, the embedded internet address comprising text at a separate location from the identifier; and
   communicating, by action of the computer processor, with the partner software module utilizing the embedded internet address.

7. The method of claim 6, further comprising deploying the client software module into a target computational environment.

8. The method of claim 6, further comprising searching for the embedded identifier based on the time-sensitive pseudo random number sequence, wherein the identifier comprises a member of a group of identifiers.

9. The method of claim 6, wherein the internet-accessible computer readable document comprises a webpage, and the embedded internet address comprises an encrypted internet address comprising a URL encrypted and encoded into a formatted text on the webpage that is indexed by search engines as normal text and not as encrypted data.

10. A method for internet communication, the method comprising:
    embedding, by action of a first computer processor of a partner module, an identifier at a location in an internet-accessible computer readable document;
    embedding, by action of the first computer processor, an internet address comprising text in the internet-accessible computer readable document in relation to the identifier at a separate location from the identifier;
    generating, by action of a second computer processor of a client module, a duplicate of the identifier utilizing a time-sensitive pseudo-random number sequence known in common by the client module and the partner module;
    performing, by action of the second computer processor, an internet search query for the identifier using an internet search engine utilizing the duplicate of the identifier as a search term;
    locating, by action of the second computer processor, the identifier to obtain the internet-accessible computer readable document embedding the identifier;
    locating, by action of the second computer processor, the internet address from the obtained internet-accessible computer readable document; and
    configuring internet communication between the client module and the partner module utilizing the internet address.

11. The method of claim 10, further comprising generating the identifier using an algorithm based on the time-sensitive pseudo random number sequence, wherein the identifier comprises a member of a group of identifiers.

12. The method of claim 10, further comprising searching for the identifier based on the time-sensitive pseudo random number sequence, wherein the identifier comprises a member of a group of identifiers.

13. The method of claim 10, wherein the internet-accessible computer readable document comprises a webpage, and the internet address comprises an encrypted internet address comprising a URL encrypted and encoded into a formatted text on the webpage that is indexed by search engines as normal text and not as encrypted data.

14. The method of claim 10, further comprising generating the identifier using an algorithm further based on a time sequence, wherein the identifier comprises a member of a group of identifiers.

15. The method of claim 10, further comprising searching for the identifier further based on a time sequence, wherein the identifier comprises a member of a group of identifiers.

16. One or more non-transitory computer-readable storage media having computer-executable instructions embodied therein, wherein when executed by at least one processor of a partner module, the computer-executable instructions cause the at least one processor to:
- embed an identifier at a location in an internet-accessible computer readable document;
- embed an internet address comprising text in the internet-accessible computer readable document in relation to the identifier at a separate location from the identifier;
- communicate with a client software module that:
  - generates a duplicate of the identifier utilizing a time-sensitive pseudo-random number sequence known in common by the client software module and the partner module;
  - performs an internet search query for the identifier using an internet search engine utilizing the duplicate of the identifier as a search term;
  - locates the identifier to obtain the internet-accessible computer readable document embedding the identifier; and
  - locates the internet address from the obtained internet-accessible computer readable document; and
- configure, in response to a request from the client software module, internet communication between the client software module and the partner module based on the internet address utilized in the request.

17. The non-transitory computer-readable storage media according to claim 16, wherein the internet-accessible computer readable document comprises a webpage, and the internet address comprises an encrypted internet address comprising a URL encrypted and encoded into a formatted text on the webpage that is indexed by search engines as normal text and not as encrypted data.

18. The non-transitory computer-readable storage media according to claim 16, further comprising computer-executable instructions for generating the identifier using an algorithm based on the time-sensitive pseudo random number sequence, wherein the identifier comprises a member of a group of identifiers.

19. The non-transitory computer-readable storage media according to claim 16, further comprising computer-executable instructions for searching for the identifier based on the time-sensitive pseudo random number sequence, wherein the identifier comprises a member of a group of identifiers.

* * * * *